United States Patent
Chen et al.

(10) Patent No.: US 8,543,972 B2
(45) Date of Patent: Sep. 24, 2013

(54) GATEWAY DATA DISTRIBUTION ENGINE

(75) Inventors: Yingyu Chen, Shanghai (CN); Zhijian Wang, Shanghai (CN)

(73) Assignee: SAP AG, Walldorf (DE)

(*) Notice: Subject to any disclaimer, the term of this patent is extended or adjusted under 35 U.S.C. 154(b) by 206 days.

(21) Appl. No.: 13/196,550

(22) Filed: Aug. 2, 2011

(65) Prior Publication Data

US 2012/0311524 A1    Dec. 6, 2012

(30) Foreign Application Priority Data

May 30, 2011  (CN) .......................... 2011 1 0143066

(51) Int. Cl.
*G06F 9/44* (2006.01)

(52) U.S. Cl.
USPC ............................ 717/105; 717/121; 717/172

(58) Field of Classification Search
None
See application file for complete search history.

(56) References Cited

U.S. PATENT DOCUMENTS

| | | | |
|---|---|---|---|
| 7,174,534 B2* | 2/2007 | Chong et al. | 717/105 |
| 7,278,133 B2* | 10/2007 | Roman et al. | 717/121 |
| 7,788,637 B2* | 8/2010 | Hunt et al. | 717/105 |
| 8,015,546 B2* | 9/2011 | Jones et al. | 717/105 |
| 8,261,231 B1* | 9/2012 | Hirsch et al. | 717/121 |
| 8,341,595 B2* | 12/2012 | Arner et al. | 717/121 |
| 2002/0144233 A1* | 10/2002 | Chong et al. | 717/105 |
| 2004/0250238 A1* | 12/2004 | Singh et al. | 717/105 |
| 2008/0313282 A1* | 12/2008 | Warila et al. | 717/172 |
| 2011/0154287 A1* | 6/2011 | Mukkamala et al. | 717/105 |
| 2012/0174058 A1* | 7/2012 | Winkler et al. | 717/105 |
| 2012/0210315 A1* | 8/2012 | Kapadekar et al. | 717/172 |

OTHER PUBLICATIONS

Oracle, "Develop Mobile Applications with Oracle ADF Mobile", 2011 Oracle, pp. 1-6; <http://www.oracle.com/technetwork/developer-tools/jdev/adf-mobile-development-129800.pdf>.*

Cheng et al., "An Adaptive Mobile Application Development Framework", 2005 Springer, EUC 2005, LNCS 3824, pp. 765-774; <http://link.springer.com/content/pdf/10.1007%2F11596356_76.pdf>.*

Soroker et al., "Pegboard: A Framework for Developing Mobile Applications", 2006 ACM, MobiSys '06, Jun. 19-22, Uppsala, Sweden, pp. 138-150; <http://dl.acm.org/citation.cfm?doid=1134680.1134695>.*

Choi et al., "Application Framework for Multi Platform Mobile Application Software Development", 2009 IEEE, ICACT 2009, Feb. 15-18, 2009, pp. 208-213; ISBN 978-89-5519-139-4; <http://ieeexplore.ieee.org/stamp/stamp.jsp?tp=&arnumber=4809935>.*

(Continued)

*Primary Examiner* — Thuy Dao
*Assistant Examiner* — Ben C Wang
(74) *Attorney, Agent, or Firm* — Fish & Richardson P.C.

(57) ABSTRACT

Implementations include a method, system, and apparatus for receiving, from a user communicably connected to a network, a selection of one or more gateway service data categories; receiving, from the user, a selection of an operating platform of a mobile device operable to be communicably connected to the network; generating a configuration file comprising a selection of gateway service data associated with one or more gateway service data categories and the operating platform selection; generating a data store file and a development library associated with the operating platform selection; transferring the configuration file, the data store file, and the development library to a repository communicably connected to the network; and generating an application template comprising the configuration file, the data store file, and the development library, wherein the mobile application is developed on the mobile device from the application template while the mobile device is communicably disconnected from the network.

30 Claims, 6 Drawing Sheets

(56) References Cited

OTHER PUBLICATIONS

Michael Juntao Yuan, "Best tools for mobile application development", Oct. 18, 2002, JavaWorld, pp. 1-8 <http://www.javaworld.com/javaworld/jw-10-2002/jw-1018-wireless.html>.*

Anthony I. Wasserman, "Software Engineering Issues for Mobile Application Development", 2010 ACM, FoSER 2010, Nov. 7-8, 2010, Santa Fe, New Mexico, USA, pp. 1-4; <http://dl.acm.org/citation.cfm?doid=1882362.1882443>.*

Müller et al., "Developing Web Applications for Mobile Device", 2005 IEEE, DFMA'05, pp. 1-5; <http://ieeexplore.ieee.org/stamp/stamp.jsp?tp=&arnumber=1385222>.*

* cited by examiner

| | Table Name | Last Update | Status |
|---|---|---|---|
| ☑ | Employee List | 2010-04-10 | 📎 |
| ☑ | Sales Quation List | 2010-04-11 | 📎 |
| ☐ | Sales Inquiry List | 2010-04-11 | ⌛ |
| ☑ | Customer List | 2010-04-18 | 📎 |

Module: Q4 Data ⬇ Refresh

Initial Load | Cancel

FIG. 4C

GATEWAY DATA DISTRIBUTION ENGINE

CLAIM OF PRIORITY

This application claims priority under 35 U.S.C. §119 to Chinese Patent Application No. 201110143066.2, filed May 30, 2011, which is incorporated by reference as if fully set forth herein.

TECHNICAL BACKGROUND

This disclosure relates to facilitating the development of software applications on mobile computing devices and, more particularly, facilitating the development of software applications on mobile computing devices which are offline from a network.

BACKGROUND

Current gateway services typically support only online service consuming, which means network access can be mandatory and required when people want to access data from the gateway services. As a consequence, when a network connection is not available, the gateway services may not be reachable and people cannot access relevant data. This can be unacceptable in a business environment where business users want to work on both transactional data and analytical jobs independent of the network connection.

In addition, gateway services are often representational state transfer (REST) services in that they use the extensible markup language (XML) as the main data format. Therefore, the readability of the data can be hindered as compared to tabular data (e.g., row based data or grid based data). Moreover, developers may not be able to determine the responsive data schemas and data content, as well as the data relationship behind them.

SUMMARY

In one general embodiment, a method performed with a computing system for developing a mobile application includes receiving, from a user communicably connected to a network, a selection of one or more gateway service data categories; receiving, from the user, a selection of an operating platform of a mobile device operable to be communicably connected to the network; generating a configuration file comprising a selection of gateway service data associated with one or more gateway service data categories and the operating platform selection; generating a data store file and a development library associated with the operating platform selection; transferring the configuration file, the data store file, and the development library to a repository communicably connected to the network; and generating an application template comprising the configuration file, the data store file, and the development library, wherein the mobile application is developed on the mobile device from the application template while the mobile device is communicably disconnected from the network. Other embodiments include corresponding systems, apparatus, computer programs, and tangible, non-transitory storage media.

These and other embodiments can optionally include one or more of the following features: transferring the selected gateway service data to the repository; receiving, from the user, a request for the application template; and exporting the application template from the repository to the mobile device while the mobile device is communicably connected to the network; exporting the application template from the repository to the mobile device through an application development environment; receiving, via the network, a synchronization request from the mobile application developed on the mobile device from the application template; and in response to the synchronization request, exporting an updated data store file to the mobile device; exporting substantially all of the gateway service data associated with the selected one or more gateway service data categories to the mobile device; receiving a request from the mobile device for a data table of a plurality of data tables within the gateway service data; generating the updated data store file comprising the requested data table; receiving, from the user, a selection of one or more database functionalities from a plurality of database functionalities; and generating the development library including the selection of one or more database functionalities; receiving a selection of a predetermined set of one or more database functionalities from a plurality of database functionalities; receiving, from the user, a selection of an existing configuration file.

Various embodiments of a gateway data distribution engine according to the present disclosure can include one or more of the following features. For example, a gateway data distribution engine can allow partner developers (or content consultants) to get and store (or configure) data from gateway services into dedicated database files independent of the mobile device when network access is available. As a result, partner developers (or content consultants) can take full advantage of generated database file to view metadata, check row based detail item data and further analyze the data relationship when the network is not required. Furthermore, the present disclosure can open a lot of common interfaces for developers to build online/offline custom applications based on the service data. Therefore, application developers can focus on the business logic and new features provided by mobile vendor while accessing (reading) offline database authorized transparently. Further, it is still configurable to get necessary gateway tables/data in a desired sequence, and content consultants can focus on data distribution logic according to end user business role and function.

Various implementations of a gateway data distribution engine according to the present disclosure can also include one or more of the following features. For example, a gateway data distribution engine can enable business users to work on analytical jobs independent of the network connection. Other features including providing additional channels to access the gateway services; facilitating partners to build enhanced mobile application; providing a framework for application developers to access the database transparently and for content consultants to configure the database on-demand by request; supporting viewing of the database semantic easily for developers; improving performance for data access leveraging on the client capability; providing for cross application analysis via joint tables; and providing transparent data access on different mobile devices. Further features include, for example, both online consumption and offline usage; comprehensive database views and interfaces are used instead of XML sources; dynamical generated dedicated database from gateway REST services; providing a framework for application developer to access database transparently and for content consultant to configure database on demand by request; and no limit of support for a variety of mobile devices.

These general and specific aspects can be implemented using a device, system or method, or any combinations of devices, systems, or methods. The details of one or more implementations are set forth in the accompanying drawings

DESCRIPTION OF DRAWINGS

FIGS. 4A-4C illustrates example graphical user interfaces of a gateway data distribution engine according to the present disclosure.

DETAILED DESCRIPTION

In some embodiments, a gateway data distribution engine according to the present disclosure can facilitate development of a mobile application for one or more mobile devices while such devices are communicably decoupled from a communication network. For example, the gateway distribution engine generates an application template. The application template acts as a basis for development for mobile applications on the mobile device. To generate the application template, the gateway data distribution engine receives a selection of gateway service data categories and a selection of an operating platform of the mobile device. The gateway data distribution engine generates a configuration file based on the selection of the gateway service data category and the operating platform selection. The gateway data distribution engine further generates a data store file and a development library based on the operating platform selection. The gateway data distribution data engine then transfers the configuration file, the data store file, and the development library to a repository. The application template is generated to include the configuration file, the data store file and the development library such that the mobile application can be developed on the mobile device from the application template while the mobile device is communicably disconnected from the network.

Figure 1:
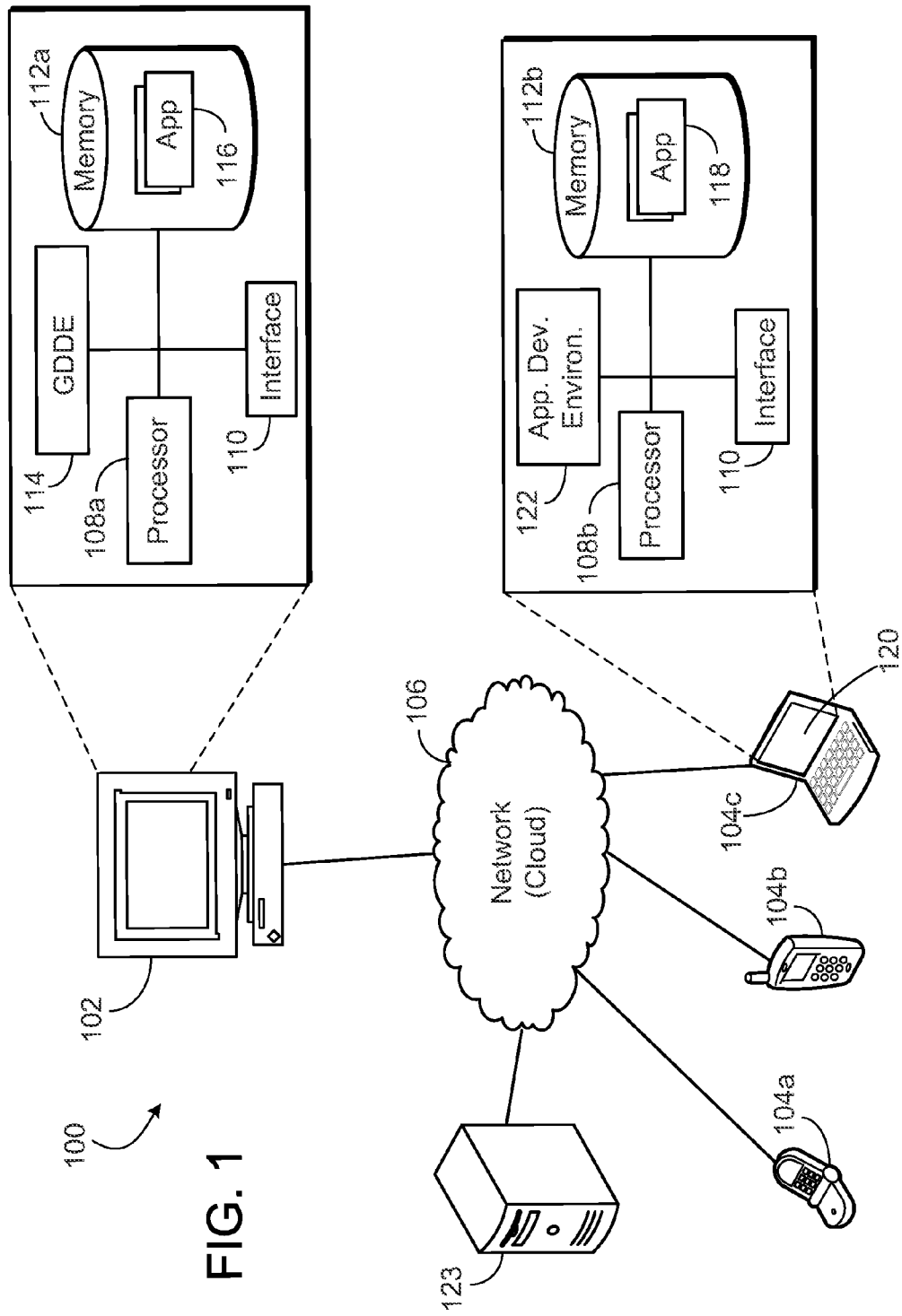
FIG. 1 illustrates an example computing environment including a gateway data distribution engine according to the present disclosure.

FIG. 1 illustrates an example computing environment 100. The environment 100 includes or is communicably coupled with a server computing device 102 ("server"), one or more clients computing devices 104 ("clients") (illustrated individually as client computing devices 104a-104c), at least some of which communicate across a network 106. In general, environment 100 depicts an example configuration of a system capable of providing stateful execution of stateless applications in a substantially transparent way, as well as dynamically determining the particular application's mode of operation in response to requests from its clients 104.

In some implementations, and as shown in FIG. 1, the server 102 includes a processor 108a, an interface 110, a memory 112a, and a gateway data distribution engine (GDDE) 114. The memory 112a can store hosted applications 116 and/or files such as a configuration file, a data store file, and/or a development library file, described further below.

At a high level, the server 102 comprises an electronic computing device operable to receive, transmit, process, store, or manage data and information associated with the environment 100. Specifically, the server 102 illustrated in FIG. 1 is responsible for receiving application requests from one or more client applications 118 associated with the clients 104 of environment 100 and responding to the received requests by processing the requests in the associated hosted application 116, and sending the appropriate response from the hosted application 116 back to the requesting client application 118. In addition to requests from the external clients 104 illustrated in FIG. 1, requests associated with the hosted applications 116 can also be sent from internal users, external or third-party customers, other automated applications, as well as any other appropriate entities, individuals, systems, or computers.

As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 can be any computer or processing device such as, for example, a blade server, general-purpose personal computer (PC), Macintosh®, workstation, UNIX-based workstation, or any other suitable device. In other words, the present disclosure contemplates computers other than general purpose computers, as well as computers without conventional operating systems. Further, illustrated server 102 can be adapted to execute any operating system, including Linux, UNIX, Windows®, Mac OS®, or any other suitable operating system.

The interface 110 is used by the server 102 for communicating with other systems in a client-server or other distributed environment (including within environment 100) connected to the network 106 (e.g., client 104, as well as other systems communicably coupled to the network 106). Generally, the interface 110 includes logic encoded in software and/or hardware in a suitable combination and operable to communicate with the network 106. More specifically, the interface 110 can include software supporting one or more communication protocols associated with communications such that the network 106 or interface's hardware is operable to communicate physical signals within and outside of the illustrated environment 100.

Each of the one or more hosted applications 116 is any application, program, module, process, or other software that can execute, change, delete, generate, or otherwise manage information according to the present disclosure, particularly in response to and in connection with one or more requests received from the illustrated clients 104 and their associated client applications 118, described further below. In certain cases, only one hosted application 116 can be located at a particular server 102. In others, a plurality of related and/or unrelated hosted applications 116 can be stored at a single server 102, or located across a plurality of other servers 102, as well. In certain cases, environment 100 can implement a composite hosted application 116. For example, portions of the composite application can be implemented as Enterprise Java Beans (EJBs) or design-time components can have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 116 can represent web-based applications accessed and executed by remote clients 104 or client applications 118 via the network 106 (e.g., through the Internet).

Further, while illustrated as internal to server 102, one or more processes associated with a particular hosted application 116 can be stored, referenced, or executed remotely. For example, a portion of a particular hosted application 116 can be a web service associated with the application that is remotely called, while another portion of the hosted application 116 can be an interface object or agent bundled for processing at a remote client 104. Moreover, any or all of the hosted applications 116 can be a child or sub-module of another software module or enterprise application (not illustrated) without departing from the scope of this disclosure. Still further, portions of the hosted application 116 can be executed by a user working directly at server 102, as well as remotely at client 104. In some instances, the server 102 can comprise a web server where the hosted applications 116 represent one or more web-based applications accessed and executed via network 106 by the clients 104 of the system to perform the programmed tasks or operations of the hosted application 116.

The GDDE 114 provides access to data from gateway services independent of the connection of the mobile devices 104 to the network 106 (e.g., whether connected or not connected to the network 106). More specifically, the GDDE 114 allows access and storage of gateway service data into dedicated database files on the mobile device 104 independent of access to network 106. As a result, application developers can utilize the generated database file to view metadata, check row based detail item data and further analyze the data relationship when the network 105 is not required. Furthermore, the GDDE 114 can facilitate application developers to build online/offline mobile applications based on the service data. Thus, application developers can access (read) offline database files transparently. Further, it is still configurable to obtain necessary gateway tables/data in a desired sequence, Each client 104 can be any computing device operable to connect to or communicate with at least the server 102 and/or via the network 106 using a wireline or wireless connection. Further, as illustrated by client 104c, each client 104 includes a processor 108b, a memory 112b, a graphical user interface (GUI) 120, and an application development environment 122. The memory 112b can store the client applications 118. In general, each client 104 comprises an electronic computing device operable to receive, transmit, process, and store any appropriate data associated with the environment 100. It will be understood that there can be any number of clients 104 associated with, or external to, environment 100. For example, while illustrated environment 100 includes three clients (104a, 104b, and 140c), alternative implementations of environment 100 can include a single client 104 communicably coupled to the server 102, or any other number suitable to the purposes of the environment 100. Additionally, there can also be one or more additional clients 104 external to the illustrated portion of environment 100 that are capable of interacting with the environment 100 via the network 106.

Further, the term "client" and "user" can be used interchangeably as appropriate without departing from the scope of this disclosure. Moreover, while each client 104 is described in terms of being used by a single user, this disclosure contemplates that many users can use one computer, or that one user can use multiple computers. As used in this disclosure, client 104 is intended to encompass a personal computer, touch screen terminal, workstation, network computer, kiosk, wireless data port, smart phone, personal data assistant (PDA), one or more processors within these or other devices, or any other suitable processing device. For example, each client 104 can include a computer that includes an input device, such as a keypad, touch screen, mouse, or other device that can accept user information, and an output device that conveys information associated with the operation of the server 102 (and hosted application 116) or the client 104 itself, including digital data, visual information, the client application 118, or the GUI 120. Both the input and output device can include fixed or removable storage media such as a magnetic storage media, CD-ROM, or other suitable media to both receive input from and provide output to users of the clients 104 through the display, namely, the GUI 120.

The GUI 120 is operable to interface with at least a portion of the environment 100 for any suitable purpose, including generating a visual representation of the client application 118 (in some instances, the client's web browser) and the interactions with the hosted application 116, including the responses received from the hosted application 116 received in response to the requests sent by the client application 118. Generally, through the GUI 120, the user is provided with an efficient and user-friendly presentation of data provided by or communicated within the system. The term "graphical user interface," or GUI, can be used in the singular or the plural to describe one or more graphical user interfaces and each of the displays of a particular graphical user interface. Therefore, the GUI 120 can represent any graphical user interface, including but not limited to, a web browser, touch screen, or command line interface (CLI) that processes information in environment 100 and efficiently presents the information results to the user.

In general, the GUI 120 can include a plurality of user interface (UI) elements, some or all associated with the client application 118, such as interactive fields, pull-down lists, and buttons operable by the user at client 104. These and other UI elements can be related to or represent the functions of the client application 118, as well as other software applications executing at the client 104. In particular, the GUI 120 can be used to present the client-based perspective of the hosted application 116, and can be used (as a web browser or using the client application 118 as a web browser) to view and navigate the hosted application 116, as well as various web pages located both internal and external to the server, some of which can be associated with the hosted application 116. For purposes of the present location, the GUI 120 can be a part of or the entirety of the client application 118, while also merely a tool for displaying the visual representation of the client and hosted applications' 116 actions and interactions. In some instances, the GUI 120 and the client application 118 can be used interchangeably, particularly when the client application 118 represents a web browser associated with the hosted application 116.

Generally, the network 106 facilitates wireless and/or wireline communications between the components of the environment 100 (i.e., between the server 102 and the clients 104), as well as with any other local or remote computer, such as additional clients, servers, or other devices communicably coupled to network 106 but not illustrated in FIG. 1. The network 106 is illustrated as a single network in FIG. 1, but can be a continuous or discontinuous network without departing from the scope of this disclosure, so long as at least a portion of the network 106 can facilitate communications between senders and recipients. The network 106 can be all or a portion of an enterprise or secured network, while in another instance at least a portion of the network 106 can represent a connection to the Internet. In some instances, a portion of the network 106 can be a virtual private network (VPN), such as, for example, the connection between the client 104 and the server 102. Further, all or a portion of the network 106 can comprise either a wireline or wireless link. Example wireless links include 802.11a/b/g/n, 802.20, WiMax®, and/or any other appropriate wireless link. In other words, the network 106 encompasses any internal or external network, networks, sub-network, or combination thereof operable to facilitate communications between various computing components inside and outside the illustrated environment 100. The network 106 can communicate, for example, Internet Protocol (IP) packets, Frame Relay frames, Asynchronous Transfer Mode (ATM) cells, voice, video, data, and other suitable information between network addresses. The network 106 can also include one or more local area networks (LANs), radio access networks (RANs), metropolitan area networks (MANs), wide area networks (WANs), all or a portion of the Internet, and/or any other communication system or systems at one or more locations.

As mentioned above, the server 102 and the client 104 include processors 108a and 108b, respectively. Although each illustrated as a single processor 108a and 108b in FIG. 1, two or more processors can be used according to particular needs, desires, or particular embodiments of environment 100. Each processor 108 can be a central processing unit (CPU), a blade, an application specific integrated circuit (ASIC), a field-programmable gate array (FPGA), or another suitable component. Generally, the processor 108a and 108b executes instructions and manipulates data to perform the operations of the server 102 and the client 104, respectively, and specifically, the one or more plurality of hosted applications 116 or the one or more plurality of client applications 118, respectively. Specifically, the server's processor 108a executes the functionality required to receive and respond to requests from the clients 104 and their respective client applications 118, as well as the functionality required to perform the other operations of the hosted application 116.

Regardless of the particular implementation, "software" can include computer-readable instructions, firmware, wired or programmed hardware, or any combination thereof on a tangible medium operable when executed to perform at least the processes and operations described herein. Indeed, each software component can be fully or partially written or described in any appropriate computer language including C, C++, Java®, Visual Basic®, ABAP, assembler, Perl, any suitable version of 4GL, as well as others. It will be understood that while portions of the software illustrated in FIG. 1 are shown as individual modules that implement the various features and functionality through various objects, methods, or other processes, the software can instead include a number of sub-modules, third party services, components, libraries, and such, as appropriate. Conversely, the features and functionality of various components can be combined into single components as appropriate. In the illustrated environment 100, processor 108a executes one or more hosted applications 116 on the server 102.

As mentioned above, the server 102 and the client 104 include memory 112a and 112b, respectively. The memory 112 can include any memory or database module and can take the form of volatile or non-volatile memory including, without limitation, magnetic media, optical media, random access memory (RAM), read-only memory (ROM), removable media, or any other suitable local or remote memory component. The memory 112 can store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 116 or the clients 104 and their one or more client applications 118. Additionally, memory 112 can include any other appropriate data, such as VPN applications, firmware logs and policies, firewall policies, a security or access log, print or other reporting files, as well as others.

Environment 100 can further include a repository 123. The repository 123 can store the configuration file, the data store file, and/or the development library file, described further below While FIG. 1 is described as containing or being associated with a plurality of elements, not all elements illustrated within environment 100 of FIG. 1 can be utilized in each alternative implementation of the present disclosure. Additionally, one or more of the elements described herein can be located external to environment 100, while in other instances, certain elements can be included within or as a portion of one or more of the other described elements, as well as other elements not described in the illustrated implementation. Further, certain elements illustrated in FIG. 1 can be combined with other components, as well as used for alternative or additional purposes in addition to those purposes described herein.

Figure 2:
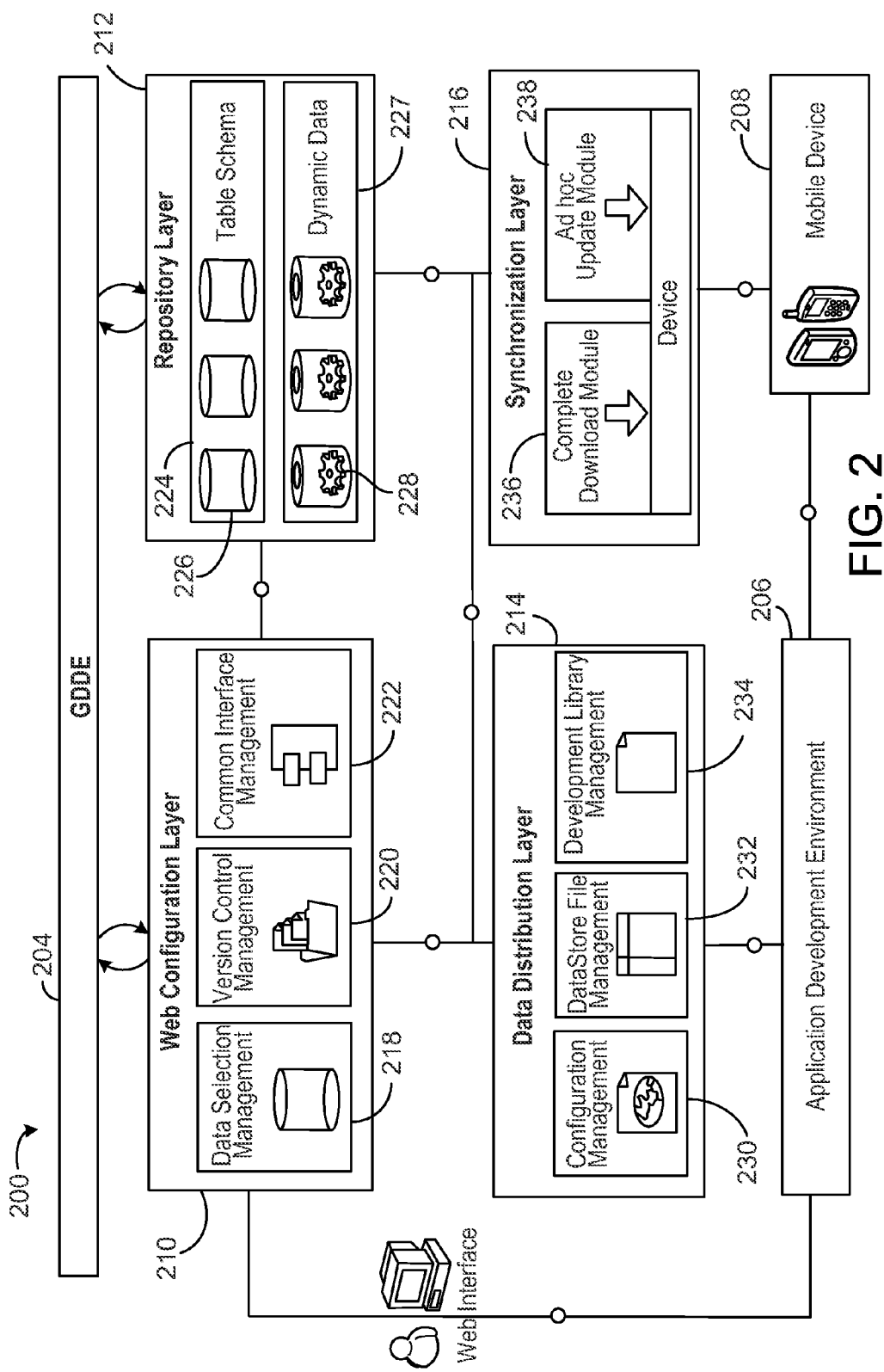
FIG. 2 illustrates a multi-layer architecture of an example computing environment including a gateway data distribution engine according to the present disclosure.

FIG. 2 illustrates a multi-layer architecture of an example computing environment 200. The environment 200 can be implemented on a distributed computing environment, such as, for example, the environment 100 of FIG. 1. The environment includes a gateway data distribution engine (GDDE) 204, an application development environment 206, and mobile devices 208. The mobile devices 208, in some embodiments, can correspond to the mobile devices 104 of FIG. 1. The GDDE 204, in some embodiments, can correspond to the GDDE 114 of FIG. 1. Further, in some implementations, the GDDE 204 can reside on the server 102 and the application development environment can reside on the mobile device 208.

The GDDE 204 can include or be communicably coupled with a web configuration layer 210, a repository layer 212, a data distribution layer 214, and a synchronization layer 216. The web configuration layer 210 facilitates a determination of one or more gateway services that can be provided by the GDDE 204. The web configuration layer 210 can also employ the data provided in the gateway services. The web configuration layer 210 can further provide an interface (e.g., GUI 120) for input of custom configurations. The web configuration layer 210, as illustrated, includes a data selection management component 218, a version control management component 220, and a common interface management component 222.

The data selection management component 218 can be dynamically generated according to a selection provided by a user (e.g., selection via the GUI 120). The data selection management component 218 connects to the GDDE 204 to obtain a service hierarchy such as object name, display name, category, and other levels within the hierarchy. This information can be displayed in a tree like list which can be selected by users through a web interface, such as the GUI 120. An XML parser (not shown) can be employed to select the data from the response from the GDDE 204 (such as an XML response from the gateway 202).

The illustrated version control management component 220 manages each user's selection of the data from the GDDE 204 as each user can have different selections at each time. Additionally, the service provided by the GDDE 204 can include new versions or new features, thus the version control management component 220 facilitates users (e.g., of the mobile devices 208) choosing a particular version as the base selection. Further, upon employing the version control management component 220, the user can choose to either start from a new selection of data or edit from an existing selection of data. Moreover, the selection information can be stored as a new configuration file or overwritten on an existing configuration file. A repository, e.g., one or more repositories on the repository layer 212, can store the configuration files of the GDDE 204, thus allowing checking of a history of the service provided by the GDDE 204.

The common interface management component 222 provides transparent access to the database with necessary functionalities. The common interface management component 222 provides functionality such as read table, join select, delete or add rows to build a library according to the device type (e.g., device type of the mobile devices 208).

The repository layer 212 provides storage and display of data stored in one or more databases (e.g., data tables) from the services provided by the GDDE 204. In some implementations, the data is displayed in relational views. Furthermore, the database can be configurable by request. The illustrated repository layer 212 can be a data persistent layer that maintains the data in a cloud repository according to a user's selection and has the data selection information passed to it. Further, the data collection process can be triggered to get data through the GDDE 204 and stored in the repository layer 212. The illustrated repository layer 212 is connected to the web configuration layer 210, the data distribution layer 214, and the synchronization layer 216.

Specifically, in one example embodiment, the data collection process includes two steps. In one step, a table schema 224 is dynamically read and parsed from the service provided by the GDDE 204. Attributes name, type, key flag and other information can be collected to create the corresponding table 226 of the table schema 224. The table schema 224 can be reloaded when the user's selection is changed or a data sync is requested. The table schemas 224 can be accessed by the data distribution layer 214 to generate the data. In another step, similar to the creation of the table schema 224, dynamic data 227 includes data rows of specific tables 228 that are read and parsed dynamically from the service provided by the gateway 202. However, the tables 228 each employ differing uniform resource locators (URLs). Furthermore, as a result of the URLs not including attribute type information in the response from the gateway 202, corresponding schema information can be used again to detect the right type for each attribute.

The illustrated data distribution layer 214 connects to the web configuration layer 210, the repository layer 212, the synchronization layer 216, and the application development environment 206. The data distribution layer 214 includes a configuration file 230, a data store file 232, and a development library file 234. The data distribution layer 214 provides control of a type of the data store file 232 that can be imported into the application development environment 206 and how the configuration file and library file appear via the GUI.

The illustrated configuration file 230 provides instructions to the application on the mobile device 208 including which data tables are to be synced and which services from the gateway 202 should be connected during the sync phase. The configuration file 230 employs the user's data selection and device information provided at the mobile device 208 at application run time. Thus, the configuration file 230 includes the information generated in a structured format.

The illustrated data store file 232 provides both online and offline consumption. Moreover, the data store file 232 provides support of an unlimited variety of types of mobile devices 208. Specifically, different device systems, such as mobile devices 208, use and support different database systems. Therefore, a corresponding data store file 232 is generated for each specified device on which the mobile application is developed. For example, device systems can include Windows Mobile, Android, iPhone, and Symbian. Corresponding database systems include SqlCe, SQLite, SQLite, and RDbNamedDatabase, respectively.

The illustrated development library file 230 allows transparent access to the database and development of applications for the mobile devices 208. To that end, the data distribution layer 208 imports the three files (the configuration file 230, the data store file 232, and the development library file 234) as a project template into the application development environment 206. Thus, the applications for the mobile devices 208 can be developed based on this project template.

The illustrated synchronization layer 216 is a bi-direction channel to exchange data with the repository layer 212. The synchronization layer 216 enables the offline application (stored on the mobile device 208) to update the minimum data (i.e., the necessary data) when connected to the network (such as network 106). After the application is developed and deployed to the mobile device 208, the mobile device 208 can utilize the service provided by the GDDE 204 offline (e.g., when the network 106 is unavailable). When the network is online (i.e., available), the mobile device 208 can also request data synchronization for the application. The synchronization layer 216 includes a complete download module 236 and an ad hoc update module 238.

The illustrated complete download module 236 provides downloading of all the service data from the gateway 202 from the application on the mobile device 208. Further, the application will check the configuration file 230 to obtain the data selection information and the device information. The application can also communicate with the data distribution layer 208 to request a new a data store file 232. In this case, the data store file 232 can be directly downloaded to the mobile device 208.

The illustrated ad-hoc download module 238 provides direct communication with the repository layer 212 to obtain the most current data for a specified table. In response, the data distribution layer 212 can be requested to generate a new but smaller data store file 228 that only includes the updated table. Moreover, the data store file 228 can be downloaded to the mobile device 208 and the data can be read and overwritten on the original database.

In one example operation of the computing environment 200, the GDDE 204 may facilitate the generation of the application template to, e.g., build a mobile application on the mobile device 208. For instance, a user may first select gateway service data that may be desired or required to build the mobile application. For example, the user may choose one or more gateway service data from different categories (e.g., CRM services, ACM services, EAM services) in a list through a web interface, such as a web interface presented through the application development environment 206.

Next, the user, through a separate or similar web interface, may choose a device type, such as Windows Mobile, Android, iPhone, Symbian, or other type. Since, in some embodiments, each operation platform may use a different database system and development resources, the users may choose the device type on which the application will be developed.

Next, the user, through a separate or similar web interface, may choose one or more database functionalities (e.g., access database, and other functions). For instance, in some embodiments, the user may be presented groups of functions to choose from, with each group including several functions. One or more groups may include a set of standard database functionality (configurable). Such groups may include a default group, which the GDDE 204 may select if no selection is made by the user.

For instance, the GDDE 204 may provide multiple common interfaces or functionalities. However, not all of these functionalities may be necessary for a specified development requirement. Thus, the user may choose which functionalities should be included in the library package, with which they can develop custom applications.

Next, specified gateway service data (i.e., based on the user's selection) may be downloaded to a repository (e.g., a dedicated database on repository layer 212, for example, in a cloud network) through the REST requests. In some embodiments, an xml parser may translate the response xml into the repository of a certain database format, which includes both dynamic table schema and table data (according to user selection).

Next, the GDDE 204 may generate and store a configuration file, for example, on the data distribution layer 214 at the configuration management 230. In some embodiments, the configuration file may contain data selection information, service version information and device information. The configuration file may be generated in order to keep such information on the mobile device 208 after application deployment.

Next, the GDDE 204 may generate and store a data store file, for example, on the data distribution layer 214 at the data store file management 232. The data store file may include the user selection of the device type. In some embodiments, each device system may use a certain kind of data store system, thus the data store file may have different data formats.

Next, the GDDE 204 may generate and store a development library, for example, on the data distribution layer 214 at the development management library 234. The development library may be based on the selected device type and desired common functionalities. This library may further be used during the development phase, which will help partner developers to build up the application with basic functions.

Next, the GDDE 204 may generate an application template including the configuration file, data store file, and/or development library. The template may then be imported via the application development environment 206 in order to, for example, facilitate development of the mobile application while the mobile device 208 is disconnected (communicably) from the GDDE 204.

Figure 3:
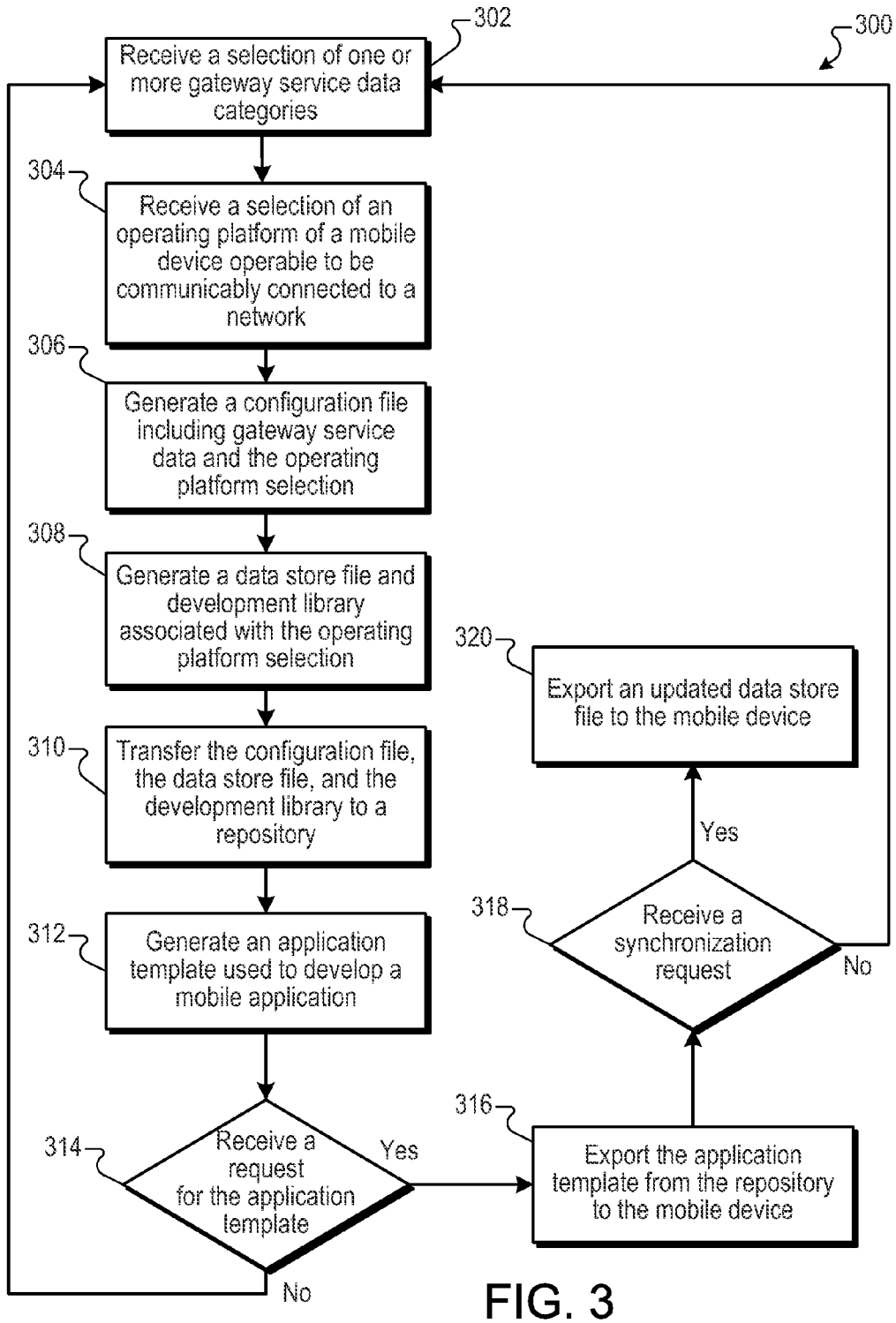
FIG. 3 illustrates an example method implemented with and/or by a gateway data distribution engine according to the present disclosure.
Figure 4A:
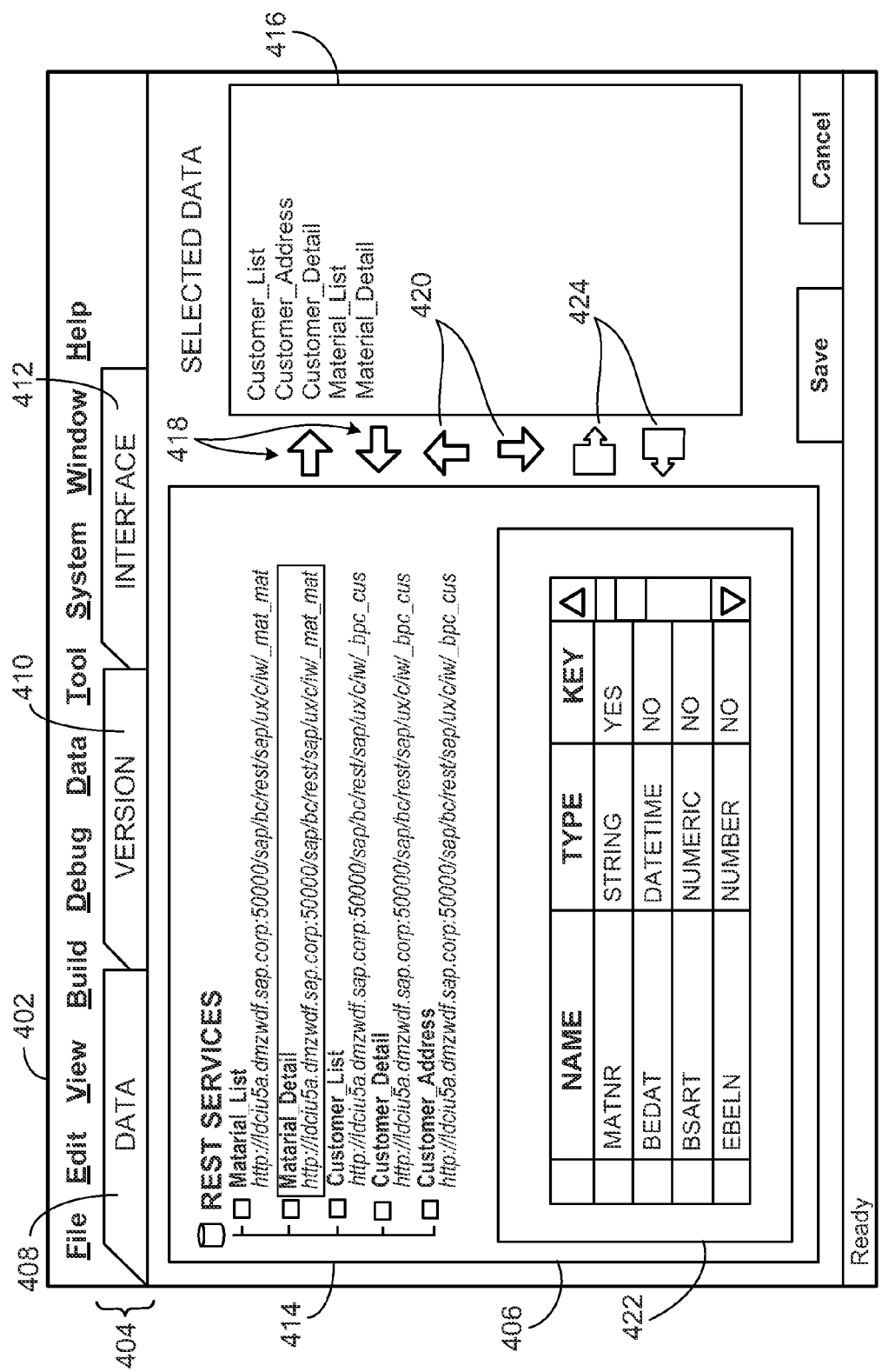

FIG. 3 illustrates an example method 300 implemented with and/or by a gateway data distribution engine, such as the gateway data distribution engine 202. A selection of one or more gateway service data categories is received (302). For example, in some aspects, step 302 can include that the selection is stored in the data selection management component 218 of the web configuration layer 210. The gateway service data categories can be classified into different categories (e.g., customer relationship management (CRM) services, adaptive case management (ACM) services, enterprise asset management (EAM) services) and can be chosen from a list provided to the mobile device 208 via a web interface, as illustrated in FIG. 4A. Specifically, FIG. 4A illustrates a GUI 402 including a tabbed portion 404 and a content portion 406. The tabbed portion 404 includes, for example, a data tab 408, a version tab 410, and an interface tab 412. When a tab of the tabbed portion 404 is selected by a user of the mobile device 208, contents relating to the selected tab are displayed in the content portion 406. When the data tab 408 is selected, the content portion 406 includes a gateway service data categories listing 414 and a selected data listing 416. Specifically, the selected data listing 416 includes selections of the services from the listing 414. The services from listing 414 can be moved to and moved from the listing 416 via arrows 418. Further, the order of services in listing 416 can be moved up or moved down via the arrows 420. Listing 414 further includes a table 422. The table 422 displays the data schema (transferred from XML into a column based format) of the selected service in listing 414. Icons 424 enable selection or de-selection of services from the listing 414.

Tabbed portion 404 also include a version tab 410. In some embodiments, the version tab 410 may provide the user with an interface with the version control management 220. In some embodiments, as described above, version control may be provided, because each user (e.g., of each mobile device 208) may have different selections at each time, which are managed. In the version tab 410, the user may choose to either start from a new data selection or edit from an existing selection. The user may also save the selection information as a new configuration file or overwrite the existing file.

The illustrated tabbed portion 404 also includes an interface tab 412. In some embodiments, the interface tab 412 may allow a user to choose specific database functionalities; choose specific sets of functionalities that can be grouped together; and/or not choose anything in which standard functionalities may be selected.

A selection of an operating platform of a mobile device operable to be communicably connected to a network is received (304). For example, in some aspects, step 304 can include each mobile device 208 employing a differing operating platform that uses a different database system and development resources. Thus, the correct operating platform is to be selected for the particular mobile device 208 such that the application can be correctly developed for the particular mobile device 208.

A configuration file is generated including gateway service data and the operating platform selection (306). For example, in some aspects, step 306 can include the configuration file 230 containing data selection information, service version information, and device information. The configuration file 230 is generated to maintain such data on the mobile device 208 after deployment of the application. In some implementations, the configuration file 230 can be stored at the data distribution layer 214. Further, the mobile devices 208 can access the data distribution layer 214 using the application development environment 206.

A data store file and a development library associated with the operating platform selection is generated (308). For example, in some aspects, step 308 can include the GDDE 204 generating a corresponding data store file 232 based on the device type that is selected. Each device system employs a particular data store system, thus the data store file is selected accordingly. The GDDE 202 can also generate the development library file 234 based on the device type that is selected and desired common functionalities. The development library file 234 can be employed during the development phase to facilitate developing the application with basic functions. In some implementations, a user can choose which functionalities are included in the development library file 234.

The configuration file, the data store file, and the development library are transferred to a repository (310). For example, in some aspects, step 310 can include, after generating the configuration file 230, the data store file 232, and the development library 234 ("files"), importing the files as a template via the application development environment 206.

An application template is generated that is used to develop mobile applications (312). For example, in some aspects, step 312 can include necessary data schemas and commonly used database functions/interfaces that are integrated into the application template. Access to the network (e.g., the network 106) is not required during generation of the application template.

Figure 4B:
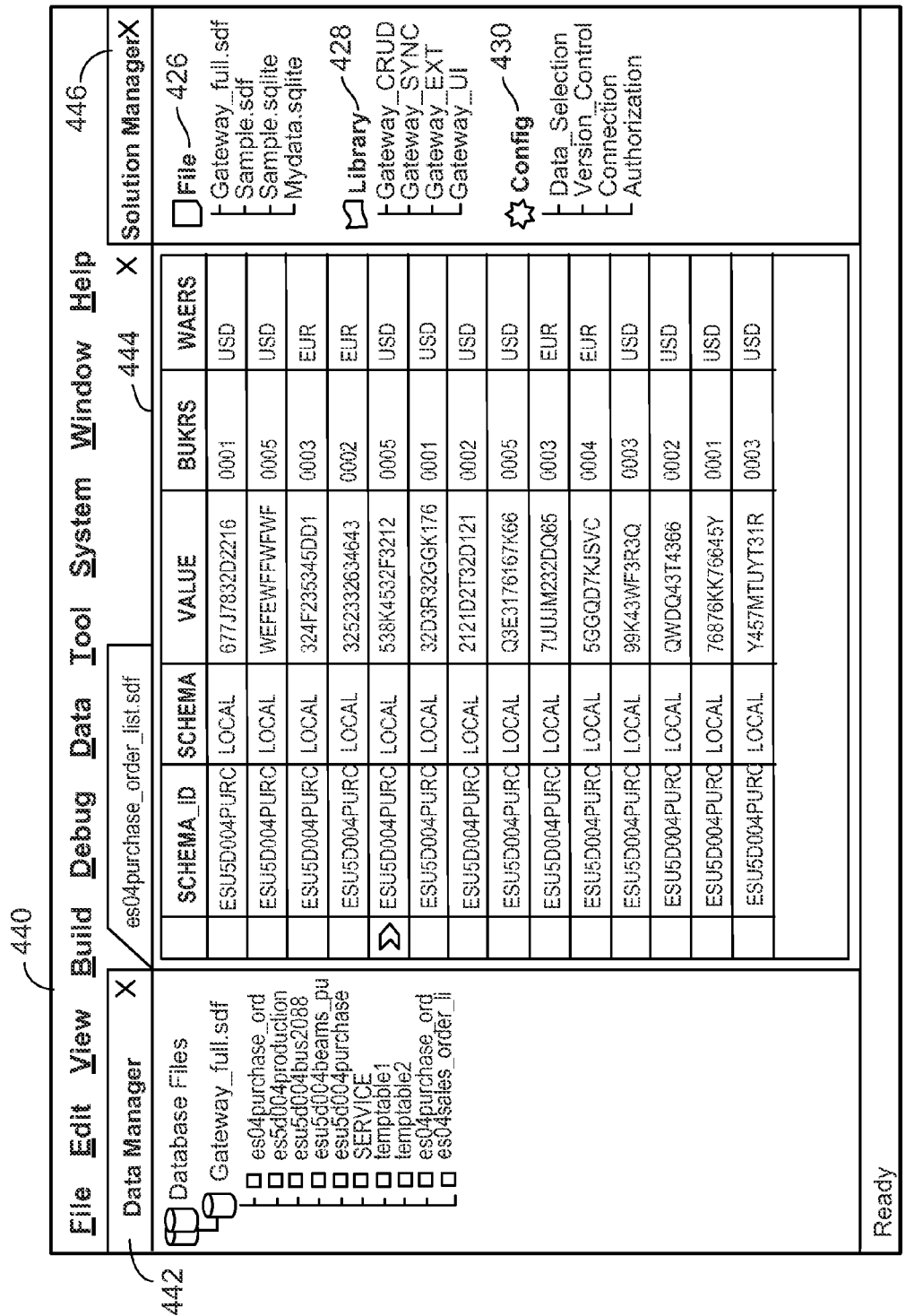

A request for the application template is received (314). The application template is exported from the repository to the mobile device (316). The application template may be used, for example, by a developer to develop a mobile application on a mobile device currently disconnected from a network (e.g., network 106 or other communication networks). FIG. 4B illustrates a GUI 440 that an application developer can employ when not connected to the network (such as network 106). The GUI 440 includes a data manager 442, a database table listing 444, and a solution manager 446. The data manager 442, as illustrated, includes a list of one or more databases that are accessible to the developer. As illustrated, the database table listing 444 shows the content of a selected database table (e.g., here, table "es04purchase_order_list.sdf" of database "Gateway_full.sdf"). The solution manager 446, as illustrated, lists the configuration file, data store file, and/or development library that are imported as the application template.

A synchronization request can be received (318). For example, in some aspects, step 318 can include the GDDE 204 receiving the synchronization request. If the synchronization request is received, an updated data store file is exported to the mobile device (320). Specifically, FIG. 4C illustrates a GUI 480 of the data store file 232 that shows synchronization of the application with the database when the mobile device 208 is connected to the network (e.g., the network 106). For instance, the GUI 480 may show the user which specific database tables have been updated (e.g., through a check mark) through the synchronization process.

A number of implementations have been described. Nevertheless, it will be understood that various modifications can be made. For example, other methods described herein besides those, or in addition to those, illustrated in FIG. 3 can be performed. Further, the illustrated steps of method 300 can be performed in different orders, either concurrently or serially. Further, steps can be performed in addition to those illustrated in method 300, and some steps illustrated in method 300 can be omitted without deviating from the present disclosure. Accordingly, other implementations are within the scope of the following claims.

What is claimed is:

1. A method performed with a computing system for developing a mobile application, the method comprising:
    receiving, from a user communicably connected to a network, a selection of one or more gateway service data categories;
    receiving, from the user, a selection of an operating platform of a mobile device operable to be communicably connected to the network;
    generating a configuration file comprising a selection of gateway service data associated with one or more gateway service data categories and the operating platform selection;
    generating a data store file and a development library associated with the operating platform selection, where each of the configuration file, the data store file, and the development library is a distinct file;
    transferring the configuration file, the data store file, and the development library to a repository communicably connected to the network; and
    generating an application template comprising the configuration file, the data store file, and the development library, wherein the mobile application is developed on the mobile device from the application template while the mobile device is communicably disconnected from the network.

2. The method of claim 1, further comprising:
    transferring the selected gateway service data to the repository.

3. The method of claim 1, further comprising:
    receiving, from the user, a request for the application template; and
    exporting the application template from the repository to the mobile device while the mobile device is communicably connected to the network.

4. The method of claim 2, wherein exporting the application template from the repository to the mobile device comprises exporting the application template from the repository to the mobile device through an application development environment.

5. The method of claim 2, further comprising:
    receiving, via the network, a synchronization request from the mobile application developed on the mobile device from the application template; and
    in response to the synchronization request, exporting an updated data store file to the mobile device.

6. The method of claim 5, wherein exporting an updated data store file to the mobile device comprises exporting substantially all of the gateway service data associated with the selected one or more gateway service data categories to the mobile device.

7. The method of claim 5, wherein receiving the synchronization request comprises receiving a request from the mobile device for a data table of a plurality of data tables within the gateway service data, the method further comprising:
    generating the updated data store file comprising the requested data table.

8. The method of claim 1, further comprising:
    receiving, from the user, a selection of one or more database functionalities from a plurality of database functionalities; and
    generating the development library including the selection of one or more database functionalities.

9. The method of claim 8, wherein receiving, from the user, a selection of one or more database functionalities from a plurality of database functionalities comprises receiving a selection of a predetermined set of one or more database functionalities from a plurality of database functionalities.

10. The method of claim 1, wherein generating a configuration file comprising gateway service data associated with the selected one or more gateway service data categories and the operating platform selection comprises receiving, from the user, a selection of an existing configuration file.

11. An apparatus comprising instructions embodied on a tangible, non-transitory computer-readable media, the instructions operable when executed to cause a computing system to perform operations comprising:
    receiving, from a user communicably connected to a network, a selection of one or more gateway service data categories;
    receiving, from the user, a selection of an operating platform of a mobile device operable to be communicably connected to the network;
    generating a configuration file comprising a selection of gateway service data associated with one or more gateway service data categories and the operating platform selection;
    generating a data store file and a development library associated with the operating platform selection, where each of the configuration file, the data store file, and the development library is a distinct file;
    transferring the configuration file, the data store file, and the development library to a repository communicably connected to the network; and generating an application template comprising the configuration file, the data store file, and the development library, wherein the mobile application is developed on the mobile device from the application template while the mobile device is communicably disconnected from the network.

12. The apparatus of claim 11, wherein the operations further comprise:
transferring the selected gateway service data to the repository.

13. The apparatus of claim 11, wherein the operations further comprise:
receiving, from the user, a request for the application template; and
exporting the application template from the repository to the mobile device while the mobile device is communicably connected to the network.

14. The apparatus of claim 12, wherein exporting the application template from the repository to the mobile device comprises exporting the application template from the repository to the mobile device through an application development environment.

15. The apparatus of claim 12, wherein the operations further comprise:
receiving, via the network, a synchronization request from the mobile application developed on the mobile device from the application template; and
in response to the synchronization request, exporting an updated data store file to the mobile device.

16. The apparatus of claim 15, wherein exporting an updated data store file to the mobile device comprises exporting substantially all of the gateway service data associated with the selected one or more gateway service data categories to the mobile device.

17. The apparatus of claim 15, wherein receiving the synchronization request comprises receiving a request from the mobile device for a data table of a plurality of data tables within the gateway service data, the method further comprising:
generating the updated data store file comprising the requested data table.

18. The apparatus of claim 11, wherein the operations further comprise:
receiving, from the user, a selection of one or more database functionalities from a plurality of database functionalities; and
generating the development library including the selection of one or more database functionalities.

19. The apparatus of claim 18, wherein receiving, from the user, a selection of one or more database functionalities from a plurality of database functionalities comprises receiving a selection of a predetermined set of one or more database functionalities from a plurality of database functionalities.

20. The apparatus of claim 11, wherein generating a configuration file comprising gateway service data associated with the selected one or more gateway service data categories and the operating platform selection comprises receiving, from the user, a selection of an existing configuration file.

21. A computing system, comprising:
one or more memory modules;
one or more processors;
a graphical user interface; and
a contextual services module stored on one or more of the memory modules, the contextual services module operable when executed with the one or more processors to perform operations comprising:
receiving, from a user communicably connected to a network, a selection of one or more gateway service data categories;
receiving, from the user, a selection of an operating platform of a mobile device operable to be communicably connected to the network;
generating a configuration file comprising a selection of gateway service data associated with one or more gateway service data categories and the operating platform selection;
generating a data store file and a development library associated with the operating platform selection, where each of the configuration file, the data store file, and the development library is a distinct file;
transferring the configuration file, the data store file, and the development library to a repository communicably connected to the network; and
generating an application template comprising the configuration file, the data store file, and the development library, wherein the mobile application is developed on the mobile device from the application template while the mobile device is communicably disconnected from the network.

22. The computing system of claim 21, the operations further comprising:
transferring the selected gateway service data to the repository.

23. The computing system of claim 21, the operations further comprising:
receiving, from the user, a request for the application template; and
exporting the application template from the repository to the mobile device while the mobile device is communicably connected to the network.

24. The computing system of claim 22, wherein exporting the application template from the repository to the mobile device comprises exporting the application template from the repository to the mobile device through an application development environment.

25. The computing system of claim 22, the operations further comprising:
receiving, via the network, a synchronization request from the mobile application developed on the mobile device from the application template; and
in response to the synchronization request, exporting an updated data store file to the mobile device.

26. The computing system of claim 25, wherein exporting an updated data store file to the mobile device comprises exporting substantially all of the gateway service data associated with the selected one or more gateway service data categories to the mobile device.

27. The computing system of claim 25, wherein receiving the synchronization request comprises receiving a request from the mobile device for a data table of a plurality of data tables within the gateway service data, the method further comprising:
generating the updated data store file comprising the requested data table.

28. The computing system of claim 21, the operations further comprising:
receiving, from the user, a selection of one or more database functionalities from a plurality of database functionalities; and
generating the development library including the selection of one or more database functionalities.

29. The computing system of claim 28, wherein receiving, from the user, a selection of one or more database functionalities from a plurality of database functionalities comprises receiving a selection of a predetermined set of one or more database functionalities from a plurality of database functionalities.

30. The computing system of claim 21, wherein generating a configuration file comprising gateway service data associated with the selected one or more gateway service data categories and the operating platform selection comprises receiving, from the user, a selection of an existing configuration file.

* * * * *